United States Patent [19]

Suzuki et al.

[11] Patent Number: 4,629,713

[45] Date of Patent: Dec. 16, 1986

[54] FINELY POROUS CLAY FORMED PREPONDERANTLY OF SPECTITE TYPE MINERAL AND METHOD FOR MANUFACTURE OF SAID CLAY

[75] Inventors: Kenzi Suzuki; Shozo Iida; Hiroshi Sakami; Kaoru Kawase, all of Nagoya, Japan

[73] Assignees: Agency of Industrial Science and Technology; Ministry of International Trade and Industry, both of Tokyo, Japan

[21] Appl. No.: 691,765

[22] Filed: Jan. 16, 1985

[30] Foreign Application Priority Data

| | | | |
|---|---|---|---|
| Jan. 20, 1984 | [JP] | Japan | 59-9256 |
| Feb. 8, 1984 | [JP] | Japan | 59-22522 |
| Mar. 19, 1984 | [JP] | Japan | 59-52675 |
| Mar. 27, 1984 | [JP] | Japan | 59-58668 |
| Apr. 2, 1984 | [JP] | Japan | 59-65581 |
| Apr. 11, 1984 | [JP] | Japan | 59-73269 |

[51] Int. Cl.$^4$ .................... B01J 21/16; B01J 20/12
[52] U.S. Cl. .................... 502/84; 502/62; 502/63
[58] Field of Search .................... 502/62, 80, 84, 63

[56] References Cited

U.S. PATENT DOCUMENTS

| | | | |
|---|---|---|---|
| 4,410,751 | 10/1983 | Shin et al. | 502/84 |
| 4,510,257 | 4/1985 | Lewis et al. | 502/84 X |
| 4,515,901 | 5/1985 | Elattar | 502/84 |

FOREIGN PATENT DOCUMENTS

| | | |
|---|---|---|
| 54-5884 | 1/1979 | Japan . |
| 54-16386 | 2/1979 | Japan . |

*Primary Examiner*—Carl F. Dees
*Attorney, Agent, or Firm*—Oblon, Fisher, Spivak, McClelland, & Maier

[57] ABSTRACT

Finely porous clay having crystal layers separated by intervals of at least 20 Å and having a smectite type mineral as a main component thereof. This finely porous clay is manufactured by mixing the smectite type mineral with water, a water-soluble polymer, and an inorganic substance and drying or heating the resultant mixture.

3 Claims, 10 Drawing Figures

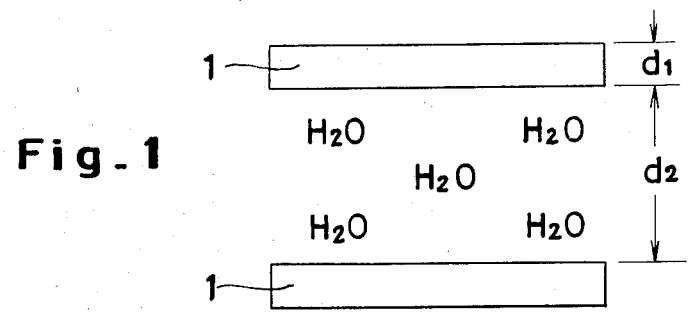
Fig_1
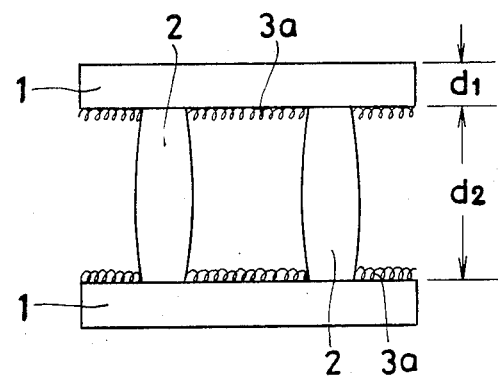
Fig_2
Fig_3
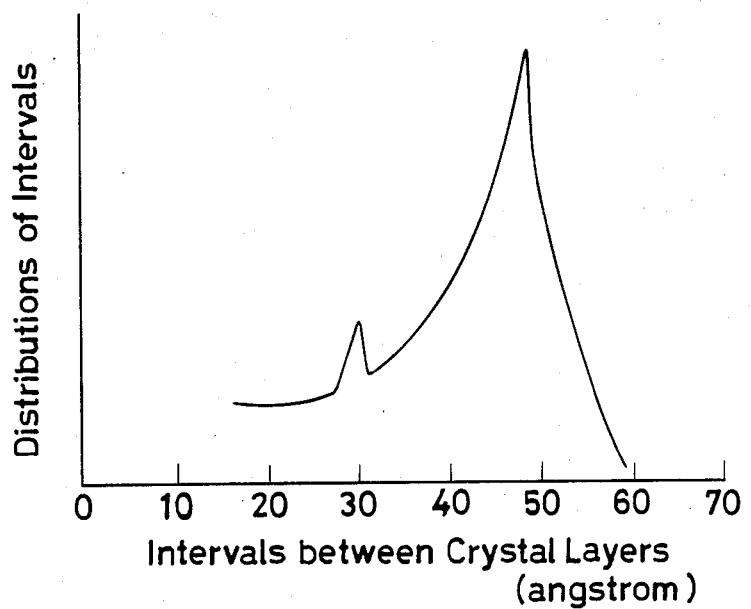

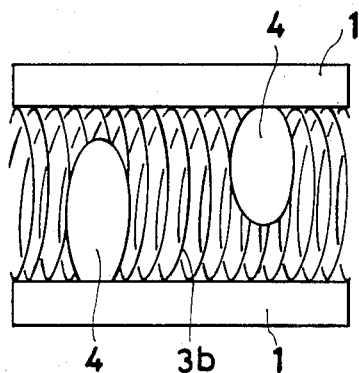
Fig. 6
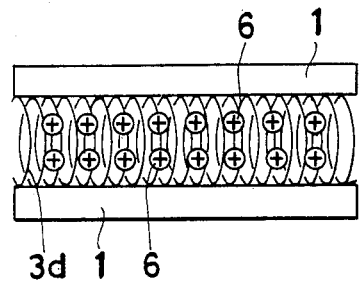
Fig. 8
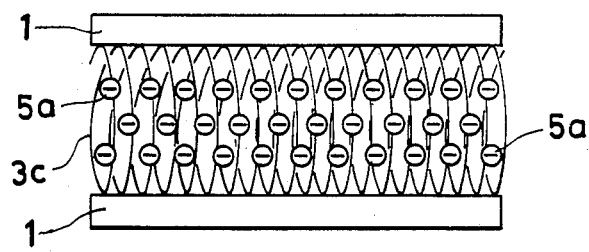
Fig. 7 (I)
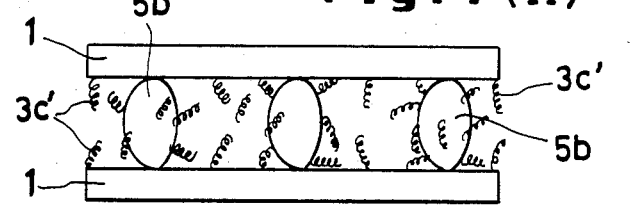
Fig. 7 (II)
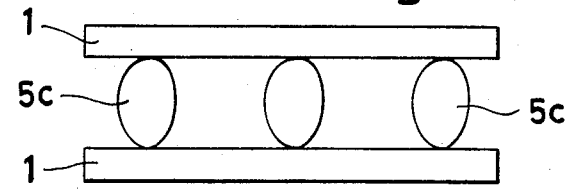
Fig. 7 (III)

FINELY POROUS CLAY FORMED PREPONDERANTLY OF SPECTITE TYPE MINERAL AND METHOD FOR MANUFACTURE OF SAID CLAY

BACKGROUND OF THE INVENTION

This invention relates to finely porous clay formed preponderantly of a smectite type mineral and having crystal layers separated by intervals of not less than 22 Å and to a method for the manufacture of the clay.

The category of smectite type minerals includes montmorillonite, bentonite, chlorite, beidellite, and synthetic mica. In the crystalline structure of montmorillonite, for example, a layer of silica tetrahydrons, a layer of alumina octahydrons, and a layer of silica tetrahydrons are bound in a superposed manner to form one crystal layer. The aluminum which constitutes itself the central metal of the layer of octahedrons is partly substituted by magnesium, a substance having a smaller positive charge than aluminum. The crystal layer, therefore, assumes a negative charge. An alkali metal ion (mainly $Na^+$) corresponding to this negative charge intervenes between the crystal layers to keep the electric charge of the crystal layer neutral. Montmorillonite, therefore, possesses abundant cation-exchange ability. Further, chiefly owing to the hydrating property of this exchanging cation, this ore absorbs a significant volume of water between the crystal layers and manifests a strikingly high swelling property. The other smectite type minerals possess properties similar to such properties of montmorillonite.

Attempts are being made to use these smectite type minerals as catalyst carriers, heat insulators, or adsorbents by making the most of their multilayer crystalline structures.

When a smectite type mineral is mixed with water, water enters the intervals between the crystal layers. The intervals between the crystal layers vary in size with the mixing ratio of the ore with water. In the presence of ample supply of water, these intervals can increase to the maximum of about 500 Å. When the smectite type mineral is mixed with water containing a cation such as $Al^{3+}$ or $Ca^{2+}$, the positive charge between the crystal layers is heightened and the intervals between the crystal layers are decreased. As the amount of the cation continues to increase, the intervals decrease eventually to about 10 Å.

Japanese Patent Disclosures SHO 54(1979)-5884 and SHO 54(1979)-16386 disclose inventions relating to a method for the manufacture of a porous clay of smectite type mineral containing between the layers of the smectite type mineral a cationic hydroxy metal complex, aluminum chlorohydroxide complex, silicates, phosphates, and zirconia by mixing the smectite type mineral, a cationic inorganic substance, and water, causing the cationic inorganic substance to exchange ion with the exchanging cation between the crystal layers, and hydrolyzing the resultant composite. In this porous clay, the intervals between the crystal layers are not more than about 10 Å.

If a smectite type mineral clay having such small intervals between the crystal layers is used as an adsorbent or a heat insulator, there are times when the clay will not bring about the intended effect as much as desired. When this clay is used for refining gasoline, for example, only low molecular hydrocarbons of smaller numbers of carbon atoms among other hydrocarbons of gasoline are allowed to enter the intervals between the crystal layers while hydrocarbons of relatively high molecular weights having larger numbers of carbon atoms are prevented from entering such intervals. Thus, the clay fails to manifest the intended effect sufficiently in refining the gasoline. If this clay is used as a heat insulator, the intervals between the crystal layers are filled to capacity with water simply on exposure to a mass of gas having a relative humidity of about 10%.

In the circumstance, there has been a strong demand for the development of finely divided porous clay having crystal layers separated by much larger intervals and a method for the manufacture of the clay.

An object of this invention is to provide a smectite type mineral clay having larger intervals between crystal layers than the conventional smectite type mineral clay.

Another object of this invention is to provide a method for the manufacture of a smectite type mineral clay having larger intervals between crystal layers than the conventional smectite type mineral clay.

SUMMARY OF THE INVENTION

The objects described above are accomplished by a finely porous clay which has an inorganic substance and optionally a water-soluble polymer contained in the intervals between the crystal layers of not less than 20 Å in thickness of a smectite type mineral and a method for manufacturing finely porous clay having crystal layers separated by intervals of not less than 20 Å by mixing a smectite type mineral with a water-soluble polymer, an inorganic substance, and water thereby producing a mixed composite and subsequently drying or heating the mixed composite thereby expelling all or most of the water-soluble polymer and allowing the inorganic material to be interposed between the crystal layers.

BRIEF DESCRIPTION OF THE DRAWINGS

FIG. 1 is a diagram illustrating the state a smectite type mineral assumes when the mineral is mixed with water.

FIG. 2 is a diagram illustrating the structure of a finely porous clay of the present invention wherein a part of the water-soluble polymer remains unexpelled.

FIGS. 3–5 are diagrams illustrating the distribution of intervals between the crystal layers of the finely divided porous clay of the present invention.

FIG. 6 is a diagram illustrating the state assumed by a mixture of silica sol, a smectite type mineral, water, and a water-soluble polymer.

FIG. 7 is an explanatory diagram illustrating in model the change in the state of a mixture of water glass or an alkali aluminate, a smectite type mineral, water, and a water-soluble polymer.

FIG. 8 is an explanatory diagram illustrating the state assumed after addition of a cation to a mixture of a smectite type mineral and an aqueous solution of a water-soluble polymer.

DESCRIPTION OF THE PREFERRED EMBODIMENTS

First, the finely porous clay of the present invention will be described. Specifically, the present invention concerns finely porous clay which has an inorganic substance and optionally a water-soluble polymer contained in intervals of not less than 20 Å between crystal layers of a smectite type mineral.

FIG. 1 is a diagram illustrating the state a smectite type mineral assumes when this mineral is mixed with water. In the diagram, 1 denotes a crystal layer and $d_1$ denotes the thickness of the crystal layer (about 10 Å). In this case, an interval $d_2$ between the crystal layers in a state containing water therebetween is variable as described above.

FIG. 2 is a cross section illustrating the structure of finely porous clay of the present invention. Similarly to FIG. 1, the thickness $d_1$ of the crystal layer of a smectite type mineral denoted by 1 is about 10 Å. By 2 is denoted an inorganic substance disposed between the crystal layers. By $3a$ is denoed a water-soluble polymer remaining on the surface of the crystal layer. The inorganic substance 2 serves as pillars for retaining the crystal layers widely separated by the interval $d_2$. Although the magnitude of this interval $d_2$ is widely variable, it generally falls in the range of 20 to 60 Å. This clay has been tested for properties by the nitrogen desorption technique. Typical physical properties are shown below (in approximate values).

|   | Surface area | Total surface area | Nitrogen capacity | Specific volume | Porosity |
|---|---|---|---|---|---|
| 1 | about 300 m$^2$/g | about 500 m$^2$/g | about 0.4 ml/g | about 0.8 cm$^3$/g | about 0.5 |
| 2 | about 260 m$^2$/g | about 430 m$^2$/g | about 0.4 ml/g | about 0.8 cm$^3$/g | about 0.5 |
| 3 | about 210 m$^2$/g | about 320 m$^2$/g | about 0.21 ml/g | about 0.61 cm$^3$/g | about 0.35 |

Figure 4:
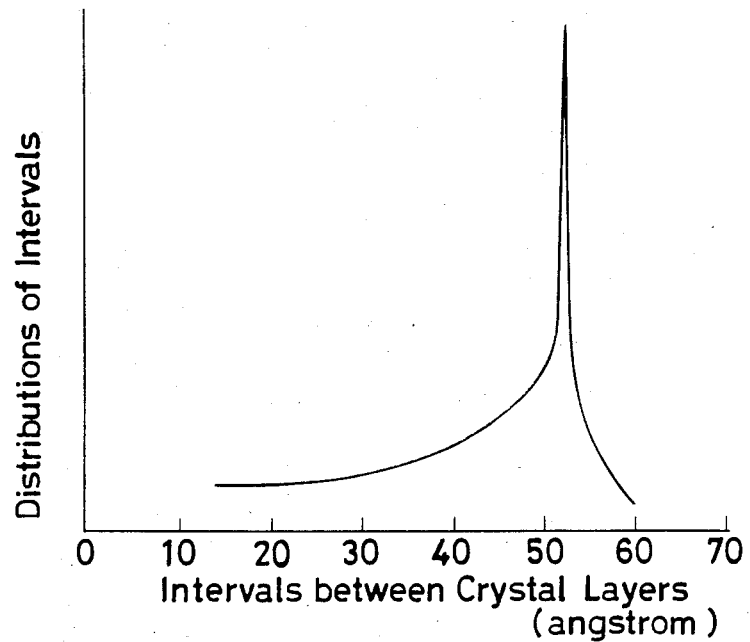
Figure 5:
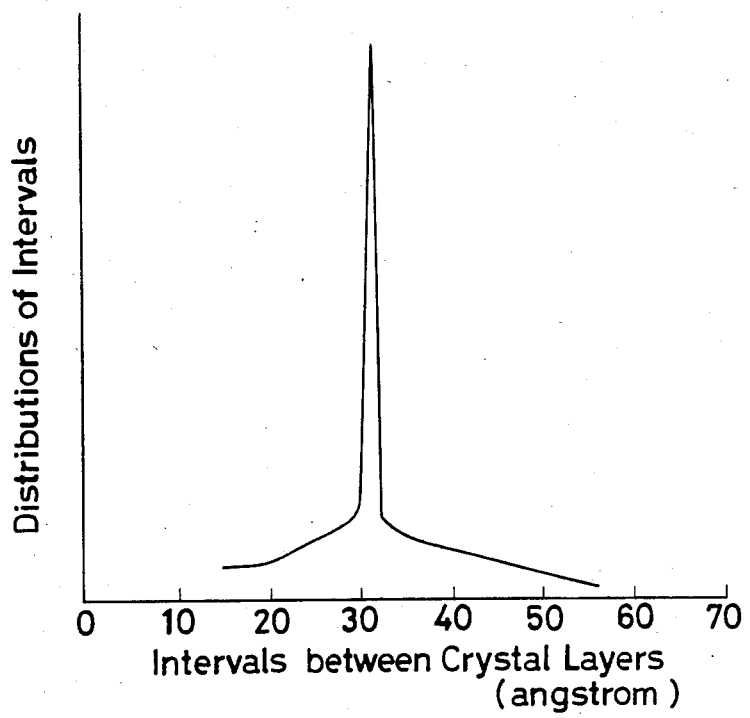

FIG. 3, FIG. 4, and FIG. 5 illustrate distributions of intervals between crystal layers in the porous clay samples 1, 2, and 3 mentioned above.

Examples of the smectite type mineral to be used advantageously in this invention include montmorillonite, bentonite, chlorite, beidelite, hectorite, and synthetic mica, and analogs thereof. One member or a mixture of two or more members selected from the smectite type minerals enumerated above may be used.

The water-soluble polymer is either (a) a substance which on dissolution in water exhibits neutral charge or (b) at least one member selected from the group consisting of polyacrylic acid derivatives, polyvinyl sulfonic acid derivaties, and carboxy cellulose derivatives.

Concrete examples of the substance (a) include natural polymers such as starch, konjak, agar, grated yam, gum arabic, glue, and gelatin and synthetic polymers such as polyethylene oxide and polyvinyl alcohol.

The inorganic substance is the gelation product of polymeric silica. For example, the product obtained by gelating polymeric silica (silica sol) with a cation or an aluminate ion can be used as the inorganic substance. The cation to be used in the gelation is a hydrogen ion or the cation of at least one of the elements of Groups IB-VII in the Periodic Table of Elements.

Now, the method by which the finely porous clay of this invention is manufactured will be described below. The raw materials required are a smectite type mineral, a water-soluble polymer, an inorganic substance, and water.

Of the raw materials, the smectite type mineral and the water-soluble polymer each fall under two types (a) and (b) as already described.

The inorganic substance can fall under numerous types and, therefore, the method by which it is prepared is varied from one type to another as described hereinbelow.

(A) Method of obtaining inorganic substance by gelating polymeric silica (silica sol) with a cation or an aluminate ion: In this case, a hydrogen ion or the cation of at least one of the elements of Groups IB-VII in the Periodic Table of Elements is used as the cation. First, the smectite type mineral, water, the water-soluble polymer, and the silica sol are mixed. The amount of water is not less than 0.4 ml and not more than 20 ml per g. of the smectite type mineral. The concentration of the water-soluble polymer in the aqueous solution thereof is such that this solution possesses fluidity of a degree enough for the solution to flow only slightly when it is tilted. The amount of the inorganic substance is in the range of 0.05 to 1 g per g. of the smectite type mineral. If the amount falls short of 0.05 g, the pillars 2 shown in FIG. 2 are not large enough to give an ample size to the interval $d_2$. If this amount exceeds 1 g, the produced clay acquires an insufficient porosity and, consequently, fails to manifest desired physical properties. As regards the sequence of mixing, a mixed aqueous solution of the water-soluble polymer and the silica sol is mixed with the smectite type mineral or the silica sol is mixed with a mixture of the smectite type mineral and the aqueous solution of the water-soluble polymer. After this mixing, the cation is added to the resultant mixture in an amount of $1 \times 10^{-4}$ mol to $1 \times 10^{-2}$ mol per g. of the smectite type mineral. If the amount of the cation so added falls short of $1 \times 10^{-4}$ mol, the silica sol is not sufficiently gelated. If it exceeds $1 \times 10^{-2}$ mol, the produced clay acquires an insufficient porosity. The cation may be substituted by an aluminate ion. The amount of the aluminate ion to be added may be in an equivalent weight relative to the inorganic substance.

The state which is assumed by the mixture prepared by the procedure described above will be described with reference to the model diagram of FIG. 6. In the diagram, 4 denotes a gel particle formed by the reaction of the silica sol with the cation or the aluminate ion. The formation of the gel will be described. The silica sol is a colloidal substance having amorphous silica particles dispersed in water. In the present case, the amorphous silica particles charged negatively are in a spherical shape. On the surface of such spherical particles, the —SiOH group and the —OH$^-$ ion are present and the alkali ion added as a stabilizer forms an electric double layer. Thus, the particles are stabilized by virtue of their mutual repulsion. When this balance in electric charge is upset as by the addition of a cation, the silica sol gains in viscosity and undergoes gelation and aggregation. The extent to which the silica sol is gelated is varied by the kind and concentration of the cation used and the temperature. When the gelation product is dried, the water-containing gel is converted into a dry gel. The solidity of the dry gel increases in proportion as the graduality of the drying is heightened, the particle size of the gel is reduced, and the degree of packing of particles (combination of large, medium, and small particles) is improved. The thermal change of the dry gel as determined by the differential thermal analysis and the thermogravimetric analysis is as follows. At about 150° C., the silica gel releases water adsorbed thereon and, consequently, loses weight by about 5%. At temperatures of 400° to 700° C., there ensues dehydration of silanol. The particles undergo no discernible change up to these temperatures.

The spiral line $3b$ shown in FIG. 6 depicts the water-soluble polymer. In the state illustrated, the water-soluble polymer keeps the opposed crystal layers apart from each other. To be more specific, the aqueous solution of a polymer generally gains in viscosity in proportion as the molecular weight of the polymer increases and the concentration thereof increases. Owing to the formation of a reticular structure, the polymer begins to acquire structural viscosity and exhibit rubber elasticity.

The present invention has one salient feature thereof in widening the intervals between the crystal layers of a smectite type mineral by utilizing the aforementioned behavior of the water-soluble polymer and combining the silica sol and the cation or the aluminate ion.

When the resultant composite of the state of FIG. 6 is dried at temperatures ranging from room temperature to 200° C., water is eliminated from the intervals. Consequently, the expanse of the water-soluble polymer is diminished and pillars of the inorganic substance are formed between the crystal layers (FIG. 2).

The method described here is applicable to all the concrete examples of water-soluble polymer enumerated above.

(B) Method using water glass or alkali aluminate as the inorganic substance: In this case, the water-soluble polymer is desired to be a substance which on dissolution in water exhibits neutral charge. But the aforementioned type (b) may be used as the water-soluble polymer.

As typical examples of the inorganic substance, water glass and alkali aluminates will be described.

Water glass has a composition which is generally expressed as $Na_2O \cdot nSiO_2 \cdot mH_2O$. It is available preponderantly in a liquid grade satisfying $n = 2 \sim 4$. Besides, liquid or crystalline products such as sodium meta-silicate ($n=1$) and sodium ortho-silicate ($n=0.5$) are marketed. The product widely marketed under the designation of sodium silicate (water glass) is a colorless, highly viscous liquid. By the molar ratio, n, of $SiO_2/Na_2O$, it is classified under the three types, No. 1 ($n=2.1$), No. 2 ($n=2.5$), and No. 3 ($n=3.1$). As simple substances, sodium ortho-silicate $Na_4SiO_3$, sodium meta-silicate $Na_2SiO_3$, sodium disilicate $Na_2Si_2O_5$, and their hydrated salts are available. Sodium silicate generally dissolves in water, exhibits alkalinity, and liberates silicon dioxide on contact with an acid. It forms water-soluble calcium silicate or aluminum silicate when it is combined with an aqueous solution of a calcium salt or an aluminum salt. A rather concentrated solution of sodium silicate is hardened to the constitution of glass or gel when it is dried or mixed with an acid, a calcium slat, or an aluminum salt.

The alkali aluminates are sodium aluminate and potassium aluminate. They dissolve in water, assume alkalinity, and produce insoluble aluminates on addition to aqueous solutions of calcium salts or aluminum salts.

In the present method, the manner of mixing the raw materials and the mixing ratio of the inorganic substance to the smectite type mineral are entirely the same as in the method of (A) described above.

Now, the change of the state of the mixture will be described with reference to FIG. 7. Part I of the diagram depicts the state assumed after the mixing. The organic substance $5a$ which is water glass or an alkali aluminate is distributed as mixed with the water-soluble polymer $3c$. In this state, the inorganic substance exists between the crystal layers and the water-soluble polymer which possesses structural viscosity keeps the crystal layers apart from each other.

In the state I, when the inorganic substance is water glass, the cation (a hydrogen ion or the cation of at least one or a mixture of two or more of the metallic elements of Groups IB-VII in the Periodic Table of Elements) or the aqueous solution of an alkali aluminate is added. When the inorganic substance is an alkali aluminate, the cation (a hydrogen ion or the cation of at least one or a mixture of two or more of the metallic elements of Groups IB-VII in the Periodic Table of Elements) or the aqueous solution of water glass is added. The amount of the cation to be added falls in the range of $1 \times 10^{-4}$ mol to $\times 10^{-2}$ mol per g. of the smectite type mineral. If this amount falls short of $1 \times 10^{-4}$ mol, pillars are not sufficiently formed. If it exceeds $1 \times 10^{-2}$ mol, use of the cation proves disadvantageous because the produced clay acquires an insufficient porosity. The mixing ratio of the alkali aluminate is desired to fall in the range of 0.5 to 4 mols per mol of water glass and the ratio is preferably desired to be unity.

Then, the resultant composite is dried at temperatures not exceeding 150° C. to expel the water from the interval between the crystal layers, deminish the expanse of the water-soluble polymer as indicated by $3c'$ in Part II of the diagram, and cause the inorganic substance to assume a changed state indicated by $5b$. Finally, the composite is heated at temperatures of 300° to 700° C. to remove by combustion the water-soluble polymer between the crystal layers. As the result, pillars $5c$ of the inorganic substance remain between the crystal layers as illustrated in Part III of the diagram.

Optionally, the step of drying may be omitted.

(C) Method using cationic oxide as inorganic substance: In this case, the water-soluble polymer is desired to be at least one member selected from the group consisting of polyacrylic acid derivatives, polyvinyl sulfonic acid derivatives, and carboxy-cellulose derivatives. Otherwise, a substance which on dissolution in water exhibits neutral charge may be used. The inorganic substance is one member or a mixture of two or more members selected from among cationic inorganic substances such as cationic oxides and cationic hydroxides. To be specific, alumina obtained by dissolving aluminum primary phosphate in water is one example of the cationic oxide. Examples of the cationic hydroxide are aluminum hydroxide obtained by dissolving in water the polyaluminum chloride represented by the general formula $(Al_2(OH)_nCl_{6-n})_m$ wherein n is about 3 and m is not more than 10 and partially hydrolyzing the resultant solution, aluminum hydroxide, chromium hydroxide, bismuth hydroxide, and iron hydroxide obtained by stirring the aqueous solutions of chlorides, nitrates, and sulfates of Al, Cr, Bi, and Fe and partially hydrolyzing the stirred aqueous solutions by gradual addition of alkalis, and the aqueous solutions of zirconium hydroxide obtained by dissolving ZrOCl in water and iron triacetate.

The present method starts with mixing the cationic inorganic substance with a mixture of the smectite type mineral with the aqueous solution of the water-soluble polymer. The state which is assumed in consequence of the mixture of the smectite type mineral with the aqueous solution of the water-soluble polymer is illustrated in FIG. 8. In this diagram, the spiral line $3d$ denotes the water-soluble polymer. In this state, the crystal layers are kept apart from each other by the structural viscosity of the water-soluble polymer. The steps which follow are entirely the same as those of the method of (B).

(D) Method using polymeric silica as inorganic substance: In this case, the water-soluble polymer is a substance which on being dissolved in water exhibits neutral charge.

This method starts with mixing the smectite type mineral, water, the water-soluble polymer, and the inorganic substance.

In the present method, the amounts of water and the inorganic substance and the concentration of the water-soluble polymer in the aqueous solution as used during the mixture of the raw materials are entirely the same as those of the aforementioned method of (A). As regards the sequence of the mixture, the mixed aqueous solution of the water-soluble polymer and the inorganic substance is mixed with the smectite type mineral or the inorganic substance is mixed with the mixture of the smectite type mineral with the aqueous solution of the water-soluble polymer. The state assumed in consequence of the mixture is the same as that of FIG. 6. Then, the clay aimed at is obtained by drying the resultant mixture. The inorganic substance used herein is polymeric silica (silica sol). It is a colloidal dispersion in water of negatively charged amorphous silica particles. These particles have a spherical shape. On the surface of the particles, the —SiOH group and the —OH—ion are present and, owing to the alkali ion added thereto as a stabilizer, form an electric double layer, and are stabilized by the mutual repulsion of the particles. The inorganic substance gains in viscosity and undergoes gelation and aggregation as the distances between the particles are diminished. When the gelation product is dried, the water-containing gel is converted into a dry gel. In this case, the solidity of the dry gel increases in proportion as the graduality of drying is heightened, the particle size is reduced, and the degree of packing of particles is increased.

When the mixture is dried at temperatures ranging from room temperature to 200° C., the water is eliminated from the intervals between the crystal layers and the expanse of the water-soluble polymer is diminished. Consequently, pillars of the inorganic substance are produced between the crystal layers as illustrated in FIG. 2.

(E) Method using cation-releasing inorganic compound and alkali as inorganic substance: In this case, the water-soluble polymer is desired to be a substance which on being dissolved in water exhibits neutral charge.

The cation to be used in the present method is the cation of at least one of the elements of Groups IB-VIII and lanthanoids in the Periodic Table of Elements such as, for example, Mg, Al, Cr, Mn, Fe, Co, Ni, Cu, Zn, Y, Zr, Ru, Pd, Pt, Cd, In, Bi, La, Nd, Eu, and Gd. This is used in the form of an inorganic compound.

The alkali is one member selected from the group consisting of hydroxides and carbonates of alkali metals, hydroxides of alkaline earth metals, ammonia, amines, and mixtures thereof.

This method starts with mixing the smectite type mineral, water, the water-soluble polymer, and the cation. The amount of water to be added is required, as in any of the methods described above, to be at least 0.4 ml per g. of the smectite type mineral. The concentration of the water-soluble polymer in the aqueous solution is in a range such that the fluidity of the solution is barely enough for the solution to flow slightly when the solution is tilted. The amount of the cation as an oxide is in the range of 0.02 g to 1 g per g. of the smectite type mineral. If the amount of the cation falls short of 0.02 g, no sufficient supply of the inorganic substance is obtained. If it exceeds 1 g, the produced clay acquires an insufficient porosity.

As regards the sequence of mixing, the cation is mixed in the form of an inorganic compound with the mixture of the smectite type mineral with the aqueous solution of the water-soluble polymer. The status assumed in consequence of the mixture is illustrated in FIG. 8. In the diagram, 6 denotes the cation and the spiral line $3d$ denotes the water-soluble polymer.

Then, the alkali is added to the resultant mixture. The amount of the alkali so added is not more than the amount (equivalent weight) enough for all the cation added to the smectite type mineral to be converted into a hydroxide. Any excess of the alkali is wasted without any desirable contribution. This amount is required to exceed the minimum level at which the added alkali is capable of inducing the hydrolysis of the cation.

Thereafter, the mixture is subjected to entirely the same drying and heating as in the method of (B) described above.

The finely divided porous clay of the present invention is useful as a catalyst carrier or an adsorbent. When it is oriented, the product is useful as a high-performance heat insulator.

Now, the present invention will be described more specifically below with reference to working examples.

The properties of the products obtained in the working examples determined by the nitrogen adsorption method are listed in the table.

EXAMPLE 1

In a solution of 0.4 g of polyvinyl alcohol having a polymerization degree of 2000 in 10 ml of water, 1.00 g of sodium montmorillonite added thereto was stirred for thorough mixture therewith. The resultant mixture and 5 ml of an aqueous 1.5 wt % sodium silicate solution added thereto were stirred. The mixture consequently produced was mixed by stirring with 1.5 ml of an aqueous 8.2 wt % aluminum chloride hexahydrate added thereto. The resulting mixture was left standing in a drier at 50° C. for one day. After the drying, the mixture was fired in an electric oven in an atmosphere of air at 500° C. for 5.5 hours, to afford finely porous clay.

EXAMPLE 2

In a solution of 0.4 g of polyvinyl alcohol having a polymerization degree of 2000 in 10 ml of water, 1.00 g of sodium montmorillonite added thereto was stirred. The resultant mixture was mixed by stirring with 5 ml of an aqueous 1.5 wt % sodium silicate solution. The mixture so produced was mixed by stirring with 3 ml of an aqueous 6.4 wt % aluminum chloride hexahydrate added thereto. The resulting mixture was then left standing in a drier at 50° C. for one day. After the drying, the mixture was fired in an electric oven in an atmosphere of air at 500° C. for 5.5 hours, to afford finely porous clay.

EXAMPLE 3

In a solution of 0.4 g of polyvinyl alcohol having a polymerization degree of 2000 in 10 ml of water, 1.00 g of sodium montmorillonite added thereto was stirred. The resultant mixture and 5 ml of an aqueous 2.9 wt % of sodium silicate solution added thereto were mixed by stirring. The mixture so produced and 3 ml of an aqueous 6.4 wt % aluminum chloride hexahydrate solution were mixed by stirring. The resulting mixture was left standing in a drier at 50° C. for one day. After the drying, the mixture was fired in an electric oven in an atmosphere of air at 500° C. for 5.5 hours, toafford finely porous clay.

EXAMPLE 4

In a solution of 0.4 g of polyvinyl alcohol having a polymerization degree of 2000 in 10 ml of water, 1.00 g of sodium montmorillonite added thereto was stirred. The resultant mixture and 5 ml of an aqueous 2.9 wt % sodium silicate solution added thereto were mixed by stirring. The mixture so produced and 3 ml of an aqueous 9.6 wt % aluminum chloride hexahydrate solution added thereto were mixed by stirring. The resulting mixture was left standing in a drier at 50° C. for one day. After the drying, the mixture was fired in an electric oven in an atmosphere of air at 500° C. for 5.5 hours, to afford finely porous clay.

EXAMPLE 5

In a solution of 0.4 g of polyvinyl alcohol having a polymerization degree of 2000 in 10 ml of water, 1.00 g of sodium montmorillonite added thereto was stirred. The resultant mixture and 5 ml of an aqueous 7.3 wt % sodium silicate solution added thereto were mixed by stirring. The mixture so produced and 3 ml of an aqueous 3.2 wt % aluminum chloride hexahydrate solution added thereto were mixed by stirring. The resultant mixture was left standing in a drier at 50° C. for one day. After the drying, the mixture was fired in an electric oven in an atmosphere of air at 500° C. for 5.5 hours, to afford finely porous clay.

EXAMPLE 6

In a solution of 0.4 g of polyvinyl alcohol having a polymerization degree of 2000 in 10 ml of water, 1.00 g of sodium montmorillonite added thereto was stirred. The resultant mixture and 5 ml of an aqueous 7.8 wt % sodium silicate solution added thereto were mixed by stirring. The mixture so produced and 2.6 ml of an aqueous 22.5 wt % aluminum chloride hexahydrate solution added thereto were mixed by stirring. The resultant mixture was left standing in a drier at 50° C. for one day. After the drying, the mixture was fired in an electric oven in an atmosphere of air at 500° C. for 5.5 hours, to afford finely porous clay.

EXAMPLE 7

In a solution of 0.4 g of polyvinyl alcohol having a polymerization degree of 2000 in 10 ml of water, 1.00 g of sodium montmorillonite added thereto was stirred. The resultant mixture and 5 ml of an aqueous 10 wt % sodium silicate solution added thereto were mixed by stirring. The mixture so produced and 8.4 ml of an aqueous 22.5 wt % aluminum chloride hexahydrate solution added thereto were mixed by stirring. The resultant mixture was left standing in a drier at 50° C. for one day. After drying, the mixture was fired in an electric oven in an atmosphere of air at 500° C. for 5.5 hours, to afford finely porous clay.

EXAMPLE 8

In a solution of 0.4 g of sodium polyacrylate having a polymerization degree of 200 in 5 ml of water, 1.00 g of sodium montmorillonite added thereto was stirred. The resultant mixture and 2 ml of an aqueous 10 wt % polyaluminum chloride solution added thereto were mixed by stirring. The resultant mixture was left standing in a drier at 50° C. for one day. After the drying, the mixture was fired in an electric oven in an atmosphere of air at 500° C. for 5.5 hours, to afford finely porous clay.

EXAMPLE 9

In a solution of 0.4 g of polysodium acrylate having a polymerization degree of 2000 in 5 ml of water, 1.00 g of sodium montmorillonite added thereto was stirred. The resultant mixture and 2 ml of an aqueous 10 wt % polyaluminum chloride solution added thereto were mixed by stirring. The resultant mixture was left standing in a drier at 50° C. for one day. After the drying, the mixture was fired in an electric oven in an atmosphere of air at 500° C. for 15 hours, to afford finely porous clay.

EXAMPLE 10

In a solution of 0.4 g of polysodium acrylate having a polymerization degree of 5000 in 5 ml of water, 1.00 g of sodium montmorillonite added thereto was stirred. The resultant mixture and 2 ml of an aqueous 10 wt % polyaluminum chloride solution added thereto were mixed by stirring. The resultant mixture was left standing in a drier at 50° C. for one day. After the drying, the mixture was fired in an electric oven in an atmosphere of air at 500° C. for 15 hours, to afford finely porous clay.

EXAMPLE 11

In a solution of 0.4 g of polysodium acrylate having a polymerization degree of 200 in 5 ml of water, 1.00 g of sodium montmorillonite added thereto was stirred. The resultant mixture and 5 ml of an aqueous 10 wt % polyaluminum chloride solution added thereto were mixed by stirring. The resultant mixture was left standing in a drier at 50° C. for one day. After the drying, the mixture was fired in an electric oven in an atmosphere of air at 500° C. for 15 hours, to afford finely porous clay.

EXAMPLE 12

In a solution of 0.4 g of polysodium acrylate having a polymerization degree of 5000 in 5 ml of water, 1.00 g of sodium montmorillonite added thereto was stirred. The resultant mixture and 5 ml of an aqueous 10 wt % polyaluminum chloride solution added thereto were mixed by stirring. The resultant mixture was left standing in a drier at 50° C. for one day. After the drying, the mixture was fired in an electric oven in an atmosphere of air at 500° C. for 15 hours, to afford finely porous clay.

EXAMPLE 13

In a solution of 0.4 g of polysodium acrylate having a polymerization degree of 200 in 5 ml of water, 1.00 g of synthetic mica added thereto was stirred. The resultant mixture and 2 ml of an aqueous 10 wt % polyaluminum chloride solution added thereto were mixed by stirring. The resultant mixture was left standing in a drier at 50° C. for one day. After the drying, the mixture was fired in an electric oven in an atmosphere of air at 500° C. for 15 hours, to afford finely porous clay.

EXAMPLE 14

In a solution of 0.4 g of polysodium acrylate having a polymerization degree of 5000 in 5 ml of water, 1.00 g of synthetic mica added thereto was stirred. The resultant mixture and 2 ml of an aqueous 10 wt % polyaluminum chloride solution added thereto were mixed by stirring. The resultant mixture was left standing in a drier at 50° C. for one day. After the drying, the mixture was fired in an electric oven in an atmosphere of air at 500° C. for 15 hours, to afford finely porous clay.

EXAMPLE 15

In 10 ml of water, 0.0189 g of polysodium acrylate having a polymerization degree of 22,000 to 70,000 was dissolved. In 10 ml of an aqueous 0.18 wt % polysodium acrylate solution so produced, 0.45 ml of an aqueous 31 wt % silica sol solution (produced by Catalysts and Chemicals Industries Co., Ltd. and marketed under trademark designation of SI-350) added thereto was stirred for mixture. In the resultant mixed aqueous solution, 1.00 g of sodium montmorillonite added thereto was stirred. The mixture so produced and 3 ml of an aqueous 3.2 wt % $AlCl_3.6H_2O$ solution added thereto were mixed by stirring. The resulting mixture was left standing in a drier at 50° C. for two days, to afford finely porous clay.

EXAMPLE 16

In 10 ml of water, 0.036 g of polysodium acrylate having a polymerization degree of 22,000 to 70,000 was dissolved. In 10 ml of an aqueous 0.36 wt % polysodium acrylate solution so produced, 0.90 ml of an aqueous 31 wt % silica sol solution (produced by Catalysts and Chemicals Industries Co., Ltd. and marketed under trademark designation of SI-350) added thereto was stirred for mixture. In the resultant mixed aqueous solution, 1.00 g of sodium montmorillonite added thereto was stirred. The mixture so produced and 3 ml of an aqueous 3.2 wt % $AlCl_3.6H_2O$ solution added thereto were mixed by stirring. The resulting mixture was left standing in a drier at 50° C. for two days, to afford finely porous clay.

EXAMPLE 17

In 20 ml of water, 0.064 g of polysodium acrylate having a polymerization degree of 22,000 to 70,000 was dissolved. In 20 ml of an aqueous 0.32 wt % polysodium acrylate solution so produced, 1.8 ml of an aqueous 31 wt % silica sol solution (produced by Catalysts and Chemicals Industries Co., Ltd. and marketed under trademark designation of SI-350) added thereto was stirred for mixture. In the resultant mixed aqueous solution, 1.00 g of sodium montmorillonite added thereto was stirred. The mixture so produced and 3 ml of an aqueous 3.2 wt % $AlCl_3.6H_2O$ solution added thereto were mixed by stirring. The resulting mixture was left standing in a drier at 50° C. for two days, to afford finely porous clay.

EXAMPLE 18

In 9 ml of water, 0.036 g of polyethylene oxide having a polymerization degree of 39,000 to 50,000 was dissolved. In 9 ml of an aqueous 0.4 wt % polyethylene oxide solution so produced, 0.9 ml of an aqueous 31 wt % silica sol solution (produced by Catalysts and Chemicals Industries Co., Ltd. and marketed under trademark designation of SI-350) added thereto was stirred for mixture. In the resultant mixed aqueous solution, 1.00 g of sodium montmorillonite added thereto was stirred. The mixture so produced and 3 ml of an aqueous 3.2 wt % $AlCl_3.6H_2O$ solution added thereto was mixed by stirring. The resulting mixture was left standing in a drier at 50° C. for two days, to afford finely porous clay.

EXAMPLE 19

In 18 ml of water, 0.073 g of polyethylene oxide having a polymerization degree of 39,000 to 50,000 was dissolved. In 18 ml of an aqueous 0.4 wt % polyethylene oxide solution so produced, 1.8 ml of an aqueous 31 wt % silica sol solution (produced by Catalysts and Chemicals Industries Co., Ltd. and marketed under trademark designation of SI-350) added thereto was stirred for mixture. In the resultant mixed aqueous solution, 1.00 g of sodium montmorillonite added thereto was stirred. The mixture so produced and 3 ml of an aqueous 3.2 wt % $AlCl_3.6H_2O$ solution added thereto were mixed by stirring. The resulting mixture was left standing in a drier at 50° C. for two days, to afford finely porous clay.

EXAMPLE 20

In 9 ml of water, 0.036 g of polyethylene oxide having a polymerization degree of 39,000 to 50,000 was dissolved. In 9 ml of an aqueous 0.4 wt % polyethylene oxide solution so produced, 0.9 ml of an aqueous 31 wt % silica sol solution (produced by Catalysts and Chemicals Industries Co., Ltd. and marketed under trademark designation of SI-350) added thereto was stirred for mixture. In the resultant mixed aqueous solution, 1.00 g of sodium montmorillonite added thereto was stirred. The resulting mixture was left standing in a drier at 0° C. for two days, to afford finely porous clay.

EXAMPLE 21

In 18 ml of water, 0.073 g of polyethylene oxide having a polymerization degree of 39,000 to 50,000 was dissolved. In 18 ml of aqueous 0.4 wt % polyethylene oxide solution so produced, 0.45 ml of an aqueous 31 wt % silica sol solution (produced by Catalysts and Chemicals Industries Co., Ltd. and marketed under trademark designation of SI-350) added thereto was stirred for mixture. In the resultant mixed aqueous solution, 1.00 g of sodium montmorillonite added thereto was stirred. The resulting mixture was left standing in a drier at 50° C. for two days, to afford finely porous clay.

EXAMPLE 22

In 10 ml of water, 0.40 g of polyvinyl alcohol having a polymerization degree of 2000 was dissolved. In 10 ml of an aqueous 4.0 wt % polyvinyl alcohol solution so produced, 1.00 g of sodium montmorillonite added thereto was stirred. The mixture so produced and 10 ml of an aqueous 22.5 wt % $AlCl_3.6H_2O$ solution added thereto were mixed by stirring. The resulting mixture was left standing in a drier at 50° C. for one day. The mixture was then fired in an electric oven in an atmosphere of air at 500° C. for 17 hours and then washed with water, to afford finely porous clay.

EXAMPLE 23

In 10 ml of water, 0.40 g of polyvinyl alchol having a polymerization degree of 2000 was dissolved. In 10 ml of aqueous 4.0 wt % polyvinyl alcohol solution so produced, 1.00 g of sodium montmorillonite added thereto was stirred. The mixture so produced and 5 ml of an aqueous 10 wt % $AlCl_3.6H_2O$ solution added thereto were mixed by stirring. The mixture consequently obtained and 3.1 ml of an aqueous 2N NaOH solution added thereto were mixed by stirring. The resulting mixture was left standing in a drier at 50° C. for one day.

It was thereafter fired in an electric oven in an atmosphere of air at 500° C. for 17 hours and washed with water, to afford finely porous clay.

EXAMPLE 24

In 10 ml of water, 0.40 g of polyvinyl alcohol having a polymerization degree of 2000 was dissolved. In 10 ml of an aqueous 4.0 wt % polyvinyl alcohol solution so produced, 1.00 g of sodium montmorillonite added thereto was stirred. The mixture so produced and 10 ml of an aqueous 22.5 wt % $AlCl_3.6H_2O$ solution added thereto were mixed by stirring. The resulting mixture and 4.8 ml of an aqueous 5N NaOH solution added thereto were mixed by stirring and then left standing in a drier at 50° C. for one day. Then, the mixture was fired in an electric oven in an atmosphere of air at 500° C. for 17 hours, to afford finely porous clay.

gum arabic, glue, gelatine, polyethylene oxide, polyvinyl alcohol, polyacrylic acid derivatives, polyvinyl sulfonic acid derivatives, and carboxycellulose derivatives, (c) one member selected from the group consisting of silica sol and water glass, (d) at least one cation selected from the elements of groups IB to VIII in the periodic table of elements, and (e) water, thereby obtaining a mixture having said water-soluble polymer and formed silica gel interposed between crystal layers of said smectite type mineral, with intervals between said crystal layers widened by said water-soluble polymer, and then removing all or most of said water-soluble polymer from said mixture and forming crystal layers separated by intervals of not less than 20Å.

2. A method according to claim 1, wherein said smectite type minerals is at least one member selected from the group consisting of montmorillonite, bentonite, chlorite, beidellite, hectorite, and synthetic mica.

3. The method of claim 1, wherein said cation in an aluminium cation.

TABLE

| Example No. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Maximum pore diameter distribution, Å | 31 | 31 | 31 | 31 | 31 | 31 | 31 | 31 | 31 | 31 | 31 | 31 | 30 | 30 | 38 30 |
| Total surface area of pores exceeding 20 Å, $m^2/g$ | 108 | 231 | 216 | 254 | 134 | 235 | 230 | 157 | 157 | 113 | 45 | 38 | 55 | 62 | 206 |
| Total surface area, $m^2/g$ | 140 | 316 | 288 | 390 | 179 | 384 | 313 | 228 | 229 | 176 | 81 | 87 | 79 | 82 | 297 |
| Nitrogen capacity, ml/g | 0.14 | 0.29 | 0.23 | 0.30 | 0.26 | 0.31 | 0.31 | 0.17 | 0.19 | 0.13 | 0.14 | 0.11 | 0.24 | 0.18 | 0.25 |
| Specific volume, $cm^3/g$ | 0.54 | 0.69 | 0.68 | 0.70 | 0.66 | 0.71 | 0.71 | 0.57 | 0.59 | 0.53 | 0.54 | 0.51 | 0.64 | 0.58 | 0.65 |
| Porosity | 0.26 | 0.42 | 0.37 | 0.43 | 0.39 | 0.44 | 0.44 | 0.30 | 0.32 | 0.25 | 0.26 | 0.22 | 0.38 | 0.31 | 0.38 |

| Example No. | 16 | 17 | 18 | 19 | 20 | 21 | 22 | 23 | 24 |
|---|---|---|---|---|---|---|---|---|---|
| Maximum pore diameter distribution, Å | 41 30 | 48 | 50 | 52 | 31 | 31 | 30 | 31 | 31 |
| Total surface area of pores exceeding 20 Å, $m^2/g$ | 242 | 287 | 225 | 262 | 170 | 211 | 346 | 127 | 200 |
| Total surface area, $m^2/g$ | 349 | 475 | 372 | 428 | 247 | 321 | 525 | 177 | 339 |
| Nitrogen capacity, ml/g | 0.31 | 0.38 | 0.29 | 0.36 | 0.17 | 0.21 | 0.55 | 0.23 | 0.32 |
| Specific volume, $cm^3/g$ | 0.71 | 0.78 | 0.69 | 0.76 | 0.57 | 0.61 | 0.95 | 0.63 | 0.72 |
| Porosity | 0.44 | 0.49 | 0.42 | 0.47 | 0.29 | 0.35 | 0.58 | 0.36 | 0.44 |

What is claimed is:

1. A method for the manufacture of finely porous clay, comprising the steps of (a) mixing a smectite type minerals, (b) a water-soluble polymer selected from the group consisting of starch, konjak, agar, grated yam,